United States Patent [19]

Haaf

[11] 4,423,189
[45] Dec. 27, 1983

[54] COMPOSITIONS OF A POLYPHENYLENE ETHER RESIN, LOW MOLECULAR WEIGHT POLYSTYRENE AND A BLOCK COPOLYMER

[75] Inventor: William R. Haaf, Voorheesville, N.Y.

[73] Assignee: General Electric Company, Pittsfield, Mass.

[21] Appl. No.: 315,893

[22] Filed: Oct. 28, 1981

[51] Int. Cl.³ ............................................. C08L 53/00
[52] U.S. Cl. ..................................... 525/92; 524/505; 525/905
[58] Field of Search ................... 525/905, 92; 524/505

[56] References Cited

U.S. PATENT DOCUMENTS

| | | | |
|---|---|---|---|
| 3,257,357 | 6/1966 | Stamatoff | 528/212 |
| 3,281,383 | 10/1966 | Zelinski | 526/335 |
| 3,306,874 | 2/1967 | Hay | 528/212 |
| 3,306,875 | 2/1967 | Hay | 528/212 |
| 3,383,435 | 5/1968 | Cizek | 525/92 |
| 3,595,942 | 7/1971 | Wald et al. | 526/335 |
| 3,639,508 | 1/1972 | Kambour | 525/92 |
| 3,696,088 | 10/1972 | DeVault | 526/335 |
| 4,090,996 | 5/1978 | Gergen et al. | 526/335 |
| 4,167,507 | 9/1979 | Haaf | 525/92 |
| 4,252,913 | 2/1981 | Katchman et al. | 525/92 |

*Primary Examiner*—A. Ziegler
*Attorney, Agent, or Firm*—Hedman, Gibson, Costigan & Hoare

[57] ABSTRACT

Thermoplastic resin blends comprised of polyphenylene ether resin, homopolystryene and hydrogenated block copolymer characterized by low melt viscosity and high impact strength are described.

12 Claims, No Drawings

COMPOSITIONS OF A POLYPHENYLENE ETHER RESIN, LOW MOLECULAR WEIGHT POLYSTYRENE AND A BLOCK COPOLYMER

BACKGROUND OF THE INVENTION

The polyphenylene (oxide) ether resins are a well-known family of linear thermoplastic engineering resins. A wide variety of these resins and a number of methods for their preparation are disclosed in Hay, U.S. Pat. Nos. 3,306,874 and 3,306,875, as well as in Stamatoff, U.S. Pat. Nos. 3,257,357 and 3,257,358.

It is known from Cizek, U.S. Pat. No. 3,383,435, among others, that polyphenylene ether resins can be compatibly admixed with polystyrene over a wide range of proportions.

Kambour in U.S. Pat. No. 3,639,508 and Haaf in U.S. Pat. NO. 4,167,507 teach that such composites can be modified for greater resistance to fracture upon impact by including elastomeric block copolymers of a vinyl aromatic such as styrene and a diene such as butadiene. These compositions are not entirely satisfactory, however, because of their relatively high melt viscosity which makes it difficult to extrude and mold them at temperatures considered advisable to avoid degradation or destabilization of the resins.

It has been observed with such compositions that a reduction in molecular weight of the homopolystyrene moiety causes a reduction in the notched Izod impact strength. The latter is an important property for engineering thermoplastic in general and polyphenylene ether resins and composition in particular and measures the ability of the molded part to resist fracture upon impact. At the same time, however, the molecular weight reduction effects a marked decrease in the melt viscosity of the composition, which is very desirable for ease of processing.

There remains a need for impact modified composites of a polyphenylene ether resin and polystyrene which exhibit a combination of low melt viscosity and high Izod impact strength.

INTRODUCTION TO THE INVENTION

The discovery has now been made that compositions of a polyphenylene ether resin, a homopolystyrene and a hydrogenated block copolymer of an alkenyl aromatic resin and a conjugated diene is characterized by the excellent property combination of low melt viscosity and high Izod impact strength. This is so even at very low molecular weights for the homopolystyrene.

The terminology "low molecular weight" as applied to the homopolystyrene is used throughout this disclosure to mean having a number average molecular weight in the range between about 400 and 65,000, as determined by conventional means.

DESCRIPTION OF THE INVENTION

The polyphenylene oxide (ether) resins useful in accordance with the present kinds of compositions are, as previously indicated, individually well known and readily available.

The preferred polyphenylene ethers are homo- and copolymers of the formula:

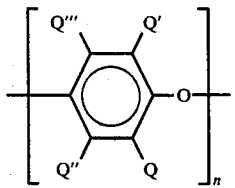

wherein Q, Q', Q" and Q"', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q"' in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

Illustrative of the homopolystyrene useful in the compositions of this invention are Arco Polymers, Inc.'s KPTL-5 (number average molecular weight about 40,000) and Foster Grant's (Hoechst) LOME (number average molecular weight about 2,000); Hercules Chemical's Piccolastic T135 resin (number average molecular weight about 12,000) E125 resin (number average molecular weight about 6,000), and D75 resin (number average molecular weight about 1,000); and Solar's GP polystyrene (number average molecular weight about 62,000).

The block copolymers of the compositions of this invention are linear, radial or branched copolymers of the A-B or A-B-A type in which A is a homo- or copolymer derived from alkenyl aromatic hydrocarbon(s) and especially those in which the aromatic moiety can be either monocyclic or polycyclic, e.g., styrene, alpha-methyl styrene, vinyl naphthalene; and B is a homo- or copolymer derived from a conjugated diene(s), e.g., butadiene, isoprene, pentadiene. Such polymers prior to hydrogenation (precursor polymers) are described in U.S. Pat. No. 3,595,942. Hydrogenation is preferably carried out under conditions which greatly favor a reduction in unsaturation of the aliphatic double bonds over reduction in unsaturation of the aromatic double bonds. Polymers of this type are described by Gergen et al in U.S. Pat. No. 4,090,996.

Such materials are available commercially from Shell Chemicals under the trade designation "Kraton G" resins.

Hydrogenated radial teleblock copolymers suitable for use in the invention can also be prepared by other procedures besides those described in Gergen et al. For instance, the radial teleblock copolymer prior to hydrogenation can be produced in accordance with the process of Zelinski, et al in U.S. Pat. No. 3,281,383. A conjugated diene such as butadiene and a vinyl aromatic compound such as styrene are co-polymerized in the presence of an organometallic compound such as n-butyl lithium to produce a copolymeric product containing chains terminating in an active metal atom, e.g., lithium. These copolymers are reacted with a coupling agent having more than one active site capable of reacting with and replacing the terminal metal atom on the polymer chains. The resulting copolymer is characterized by a structure comprised of a centrally located coupling agent from which extend in various directions several chains of the copolymer. The copolymer can then be hydrogenated in the known manner, for example, by procedures described in DeVault, U.S. Pat. No. 3,696,088. For instance, a solution of the polymer in admixture with a hydrogenation catalyst, e.g., nickel octoate, is passed through a tower at an elevated temperature, e.g., 150°–350° F., countercurrently to a stream of molecular hydrogen under pressure, e.g., 50–1000 p.s.i.g. to obtain a hydrogenated product.

A hydrogenated radial teleblock copolymer is available from Phillips Petroleum Company under the trade designation Solprene 512X.

In the foregoing copolymers, preferably the polymerized vinyl aromatic compound is polystyrene and the polydiene is polybutadiene.

The resinous composition ingredients can be present in a wide range of proportions. Composites of polyphenylene ether resin and polystyrene of from 1:99 and 99:1, on a parts by weight basis, are known. Preferably the compositions will contain from about 10 to 90 parts of a polyphenylene ether and from about 90 to 10 parts of homopolystyrene. In these preferred embodiments the block copolymer is included in amounts of from about 5 to 50 parts based on the total weight of the resins, and more usually about 10 to 30 parts of the total.

The compositions can also include other ingredients such as various fillers and/or reinforcements, e.g., glass fibers, flame retardant agents, drip retardants, stabilizers, plasticizers, mold release agents, all of which are admixed in the conventional manner. These may be present in minor but effective amounts, and typically from 1 to 50 parts based on the total weight of the principal components.

Preparation of the compositions is accomplished by any number of procedures. Usually, a fine admixture of the components is made, as on a high speed intensive blender, which is extruded and fed to a molding machine. Alternatively, the components can be melt mixed as, for example, by co-extrusion. The solidified melt can be chopped, cut or ground to particles of the desired size as a feed for molding.

The following working examples are given for purposes of illustrating preferred embodiments and are not intended as a limitation on the scope of the invention. All proportions are on a weight basis.

EXAMPLES 1–21

Compositions according to the invention were prepared by admixing 45 parts of poly(2,6-dimethyl-1,4-phenylene ether) resin (PPO, General Electric Co.), 35 parts of homopolystyrene, 20 parts of hydrogenated (saturated) styrene-butadiene block copolymer, 1.5 parts of polyethylene, 0.15 part of zinc sulfide and 0.15 part of zinc oxide. The homopolystyrene and saturated block copolymers are identified in the Table below. The ingredients were compounded on a 28 mm twin-screw extruder vacuum vented to an equivalent of 25 inches of Mercury. The extrudate was cut into pieces and injection molded into test bars on a 3 oz. Newbury injection molding machine. The temperature for extrusion and for molding was varied among different sets of examples as follows:

| Example | Set Temp (°F.) |
|---|---|
| Extrusion: | |
| 1–3 | 575 |
| 4–6 | 560 |
| 7–9 | 555 |
| 10–12 | 540 |
| 13–15 | 535 |
| 16–21 | 530 |
| Molding: | |
| 1–3 | 500/200 |
| 4–6 | 480/200 |
| 7–12 | 460/180 |
| 13–15 | 440/180 |
| 16–18 | 430/170 |
| 19–21 | 420/160 |

The compositions are evaluated for physical properties in the melted state and after molding as follows:

TABLE

| Examples | Homopolystyrene Type | Mn × 10$^{-3}$ | Sat'd Block Cop. | HDT | MV at 540° F. 100 sec$^{-1}$ | MV at 540° F. 1500 sec$^{-1}$ | 45° Gloss |
|---|---|---|---|---|---|---|---|
| 1* | Arco | 137 | KG1652 | 246 | — | — | 48 |
| 2* | Dylene 8G | | S512X | 260 | 9,500 | 2,250 | 56 |
| 3* | (high molecular weight control, not in accordance with invention) | | KG1651 | 275 | 16,000 | 2,650 | 61 |
| 4 | Solar | 62 | KG1652 | 244 | — | — | 58 |
| 5 | gp PS | | S512X | 268 | 9,000 | 2,250 | 56 |
| 6 | | | KG1651 | 270 | 16,000 | 2,800 | 60 |
| 7 | Arco | 42 | KG1652 | 255 | — | — | 58 |
| 8 | KTPL-5 | | S512X | 271 | 7,000 | 1,800 | 59 |
| 9 | | | KG1651 | 272 | 12,000 | 2,300 | 59 |
| 10 | Hercules | 12 | KG1652 | 225 | — | — | 57 |
| 11 | Piccolastic ® | | S512X | 233 | 5,100 | 1,350 | 58 |
| 12 | T135 Resin | | KG1651 | 243 | 9,500 | 2,100 | 55 |
| 13 | Hercules | 6 | KG1652 | 215 | — | — | 61 |
| 14 | Piccolastic | | S512X | 222 | 4,700 | 1,300 | 59 |
| 15 | E125 Resin | | KG1651 | 232 | 8,500 | 1,850 | 58 |
| 16 | Foster- | 1.7 | KG1652 | 221 | — | — | 58 |
| 17 | Grant | | S512X | 233 | 2,300 | 775 | 61 |
| 18 | (Hoechst) LOME | | KG1651 | 230 | 3,600 | 1,150 | — |
| 19 | Hercules | 0.8 | KG1652 | 169 | — | — | 55 |
| 20 | Piccolastic | | S512X | 184 | 2,300 | 725 | 61 |
| 21 | D75 Resin | | KG1651 | 184 | 4,600 | 1,250 | 59 |

| Tens. | Strengths × 10$^{-3}$ |

TABLE-continued

| Examples | Izod | Gardner | % E | TYS | TUS | FYS | FMOD |
|---|---|---|---|---|---|---|---|
| 1 | 7.6 | 300 | 40 | NDY | 6.9 | 6.5 | 186 |
| 2 | 6.5 | 300 | 37 | NDY | 7.1 | 9.8 | 260 |
| 3 | 10.2 | 360 | 47 | 9.3 | 8.2 | 13.6 | 353 |
| 4 | 7.6 | 290 | 50 | 7.1 | 7.0 | 7.0 | 216 |
| 5 | 7.0 | 260 | 40 | NDY | 7.1 | 10.2 | 267 |
| 6 | 10.1 | 330 | 45 | 9.0 | 8.1 | 13.2 | 345 |
| 7 | 6.0 | 250 | 46 | NDY | 7.1 | 7.8 | 241 |
| 8 | 5.1 | 270 | 39 | 7.7 | 7.6 | 11.8 | 306 |
| 9 | 9.8 | 370 | 70 | 9.0 | 9.3 | 13.0 | 329 |
| 10 | 6.6 | 290 | 46 | NDY | 6.9 | 6.1 | 202 |
| 11 | 7.8 | 260 | 38 | NDY | 7.0 | 9.7 | 269 |
| 12 | 12.0 | 310 | 86 | 8.4 | 8.9 | 13.2 | 333 |
| 13 | 7.3 | 290 | 46 | NDY | 7.3 | 8.0 | 257 |
| 14 | 6.3 | 300 | 36 | NDY | 7.3 | 11.2 | 314 |
| 15 | 10.8 | 350 | 65 | 9.3 | 8.7 | 13.1 | 350 |
| 16 | 2.4 | >200 | 29 | 6.7 | 6.6 | 10.8 | 308 |
| 17 | 2.3 | 235 | 28 | 7.4 | 6.8 | 12.1 | 323 |
| 18 | 10.0 | 250 | 32 | 8.5 | 7.8 | 11.4 | 311 |
| 19 | 6.6 | 230 | 36 | NDY | 6.6 | 6.9 | 226 |
| 20 | 4.2 | 230 | 31 | NDY | 7.3 | 10.5 | 301 |
| 21 | 10.0 | 250 | 24 | 9.7 | 8.8 | 13.3 | 348 |

The saturated block copolymers used were of two types:
(a) Linear polystyrene-hydrogenated polybutadiene-polystyrene triblock copolymers include Shell's Kraton® G 1652 (MW=52,500; 29% PS) and Kraton G1651 (MW=174,000; 33% PS).
(b) Phillips' Solprene® 512X is a radial teleblock copolymer of polystyrene and hydrogenated polybutadiene ($\overline{Mn}$=89,000; 30% PS; radiality=3-4).

Physical properties measured include:
HDT=Heat deflection temperature (°F.) under 264 psi fiber stress; $\frac{1}{8}'' \times \frac{1}{2}'' \times 2\frac{1}{2}''$ specimen.
MV=Melt viscosity (poise) measured at 540° F. and at 100 sec$^{-1}$ and 1500 sec$^{-1}$, using an Instron capillary melt rheometer with no end corrections; pellet sample.
45° Gloss=Surface gloss (relative, dimensionless units); $\frac{1}{8}'' \times 2\frac{1}{2}''' \times 3\frac{3}{4}''$ specimen.
Izod=Notched Izod impact resistance (ft.-lbs./in.-n); $\frac{1}{8}'' \times \frac{1}{2}'' \times 2\frac{1}{2}''$ specimen.
Gardner=Falling-dart impact resistance (in.-lbs.); $\frac{1}{8}''$-$\times 2\frac{1}{2}'' \times 3\frac{3}{4}''$ specimen.
Tens. %E=Percent tensile elongation; $\frac{1}{8}'' \times 2\frac{1}{2}''$ L-type specimen.
TYS, TUS=Tensile yield (psi) and ultimate (psi) strengths; $\frac{1}{8}'' > 2\frac{1}{2}''$ L-type specimen.
FYS, FMOD=Flexural yield strength (psi) and modulus (psi); $\frac{1}{8}'' \times \frac{1}{2}'' \times 2\frac{1}{2}''$ specimen.
NDY=No discrete yield point was observed on the force vs. extension trace in the tensile test.

It is seen that as the molecular weight of the homopolystyrene component declines from one example to the next, the melt viscosity undergoes the desired decrease and for the most part this is achieved with good retention of the impact strength.

The above mentioned patents/and or publications are incorporated herein by reference. Obviously, other modifications and variations of the present invention are possible in light of the above teachings. For example, instead of poly(2,6-dimethyl-1,4-phenylene) ether there can be substituted poly(2,6-dimethyl-co-2,3,6-trimethyl-1,4-phenylene) ether copolymer. In addition, conventional reinforcements and/or fillers, flame retardants, stabilizers, colorants, impact modifiers can be used in conventional amounts. It is therefore to be understood that changes may be made in the particular embodiments of the invention described which are within the full intended scope of the invention as defined by the appended claims.

I claim:
1. A thermoplastic composition which comprises:
   (a) a polyphenylene ether resin;
   (b) a low molecular weight homopolystyrene having a number average molecular weight in the range between about 400 and 65,000; and
   (c) a hydrogenated block copolymer of an alkenyl aromatic compound and a conjugated diene.
2. A composition according to claim 1, in which the polyphenylene ether resin is poly(2,6-dimethyl-1,4-phenylene ether).
3. A composition according to claim 1 in which the hydrogenated block copolymer is a linear or radial block copolymer.
4. A composition according to claim 1, in which in the block copolymer the alkenyl aromatic compound is styrene and the diene is butadiene.
5. A composition according to claim 1, which comprises from 5 to 95 parts by weight of a polyphenylene ether resin, from 95 to 5 parts by weight of a low molecular weight homopolystyrene, and from 5 to 50 parts of a hydrogenated block copolymer.
6. A composition according to claim 1, which comprises from 5 to 95 parts by weight of a polyphenylene ether resin, from 95 to 5 parts by weight of a low molecular weight homopolystyrene and from about 10 to 30 parts by weight of a hydrogenated block copolymer.
7. A composition according to claim 1 which further includes one or more ingredients selected from the group consisting of glass fibers, flame retardant agents, mold release agents, fillers, reinforcements, plasticizers and stabilizers.
8. A composition as defined in claim 7 in which the ingredient is glass fiber.
9. A thermoplastic molding composition which consists essentially of:
   (a) from about 10 to 90 parts of a polyphenylene ether resin;
   (b) from about 90 to 10 parts by weight of homopolystyrene having a number average molecular weight in the range between 400 and 65,000; and
   (c) from about 10 to 30 parts by weight, based on the weight of resins, of a hydrogenated block copoly- mer of an alkenylaromatic compound and a conjugated diene.

10. A composition as defined in claim 9 wherein the polyphenylene ether resin is a poly(2,6-dimethyl-1,4-phenylene ether).

11. A composition as defined in claim 9 wherein the hydrogenated copolymer is an ABA block copolymer derived from styrene and butadiene wherein A is a styrene block and B is a butadiene block.

12. A thermoplastic molding composition as defined in claim 9 wherein the hydrogenated block copolymer is a polystyrene-hydrogenated polybutadiene-polystyrene triblock copolymer.

* * * * *

UNITED STATES PATENT AND TRADEMARK OFFICE
CERTIFICATE OF CORRECTION

PATENT NO. : 4,423,189
DATED : December 27, 1983
INVENTOR(S) : William R. Haaf

It is certified that error appears in the above—identified patent and that said Letters Patent is hereby corrected as shown below:

In column 6, on line 32, after "hydrogenated" and before "block", insert the word --linear--.
In column 6, delete lines 37-39 in their entirety.
In column 6, on line 68, after "hydrogenated" and before "block", insert the word --linear--.

Signed and Sealed this

Thirtieth Day of September 1986

[SEAL]

Attest:

DONALD J. QUIGG

Attesting Officer

Commissioner of Patents and Trademarks